Figure 1:
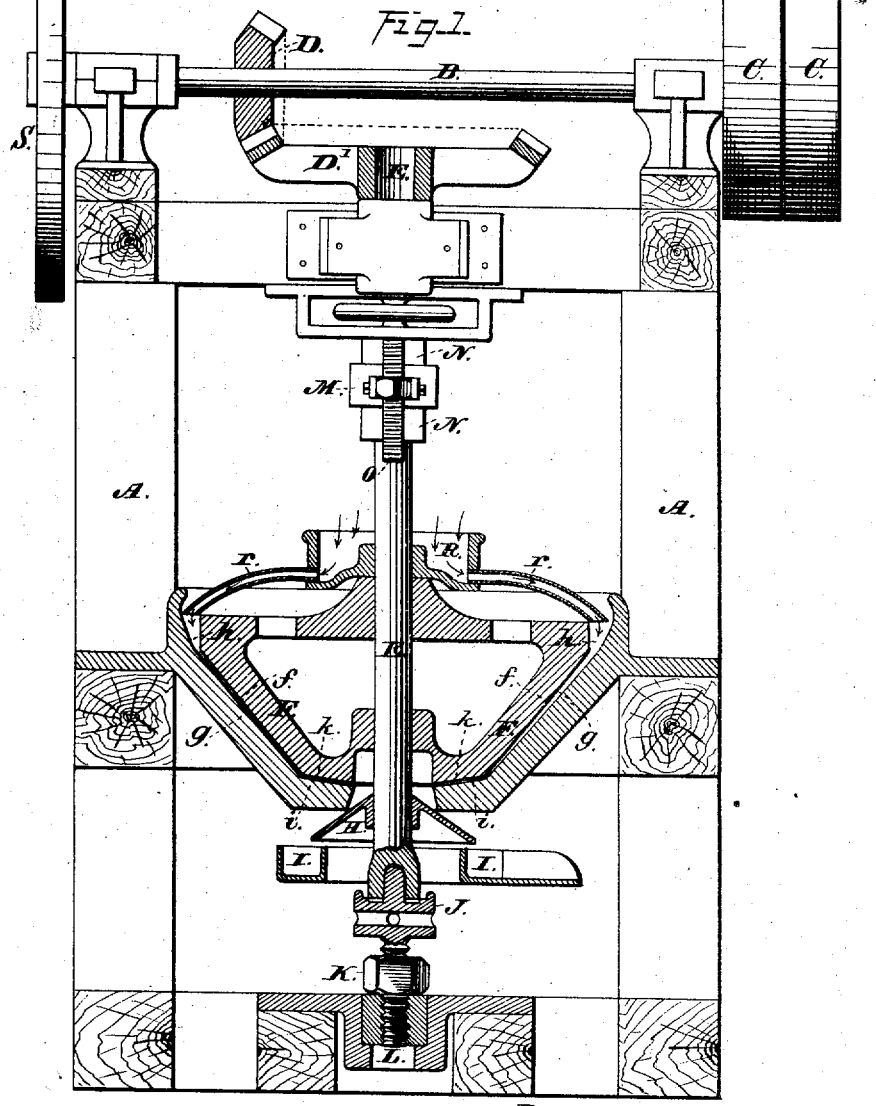

2 Sheets—Sheet 1.

S. F. HODGE.

Method of and Apparatus for Pulverizing and Separating Metalliferous Quartz, &c.

No. 9,053. Reissued Jan. 20, 1880.

WITNESSES:
Jas. E. Hutchinson
J. A. Rutherford

INVENTOR.
Saml. F. Hodge,
by James L. Norris
Attorney.

2 Sheets—Sheet 2.

S. F. HODGE.

Method of and Apparatus for Pulverizing and Separating Metalliferous Quartz, &c.

No. 9,053. Reissued Jan. 20, 1880.

WITNESSES:

Jas. E. Hutchinson.

J. A. Rutherford

INVENTOR.

Saml. F. Hodge, by James L. Norris.

Attorney.

UNITED STATES PATENT OFFICE.

SAMUEL F. HODGE, OF DETROIT, MICHIGAN.

METHOD OF AND APPARATUS FOR PULVERIZING AND SEPARATING METALLIFEROUS QUARTZ, &c.

SPECIFICATION forming part of Reissued Letters Patent No. 9,053, dated January 20, 1880.

Original No. 214,659, dated April 22, 1879. Application for Reissue filed September 18, 1879.

*To all whom it may concern:*

Be it known that I, SAMUEL F. HODGE, of Detroit, in the county of Wayne and State of Michigan, have invented certain improvements in apparatus for pulverizing metalliferous quartz, gravel, or sand, concentrating the metallic particles in the same and rolling said particles into pellets, of which the following is a specification.

This invention relates to an improved method of and apparatus for treating metalliferous quartz, gravel, sand, or ores containing free metal, whereby such substances are comminuted and the metallic particles concentrated or aggregated therein and formed into pellets, so that they can be subsequently separated with facility.

In the stamping and grinding mills usually employed for this purpose the metallic particles are disintegrated and comminuted to such an extent that they cannot be thoroughly separated by the ordinary methods, such as by amalgamation, sluice-washing, or other process.

The object of my invention is to obviate these defects and provide a means by which, while the quartz, pebbles, and sand are broken up and pulverized, the metallic portions will be concentrated and rolled together into pellets that may be easily separated subsequently.

To this end my invention consists, first, in an improved process of reducing and pulverizing metalliferous quartz, gravel, or sand, and concentrating the metallic particles contained therein, said process consisting in grinding the quartz, gravel, or sand between gradually-converging grinding-surfaces, and then rubbing the ground product between surfaces which are at a uniform distance apart and moving continuously in one direction, whereby the metallic particles are freed from earthy matter and rolled into pellets, as hereinafter more particularly described and explained; second, in an apparatus for pulverizing quartz, gravel, or sand, consisting of a rotating conical rubber mounted within a conical pan, the sides of the rubber and pan converging toward each other from the top to a point near the bottom, from which point the space between the rubber and pan is uniform to the discharge-opening, whereby the silicious portions of the material are gradually broken up and reduced to powder within the converging space, while the metallic portions thereof are rolled into pellets within the uniform space, substantially as specified.

Figure 2:
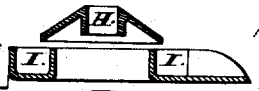
Figure 3:
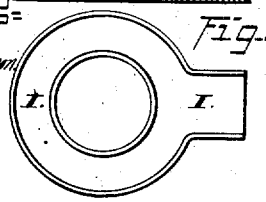
Figure 4:
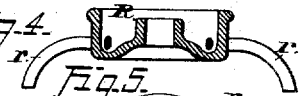
Figure 5:
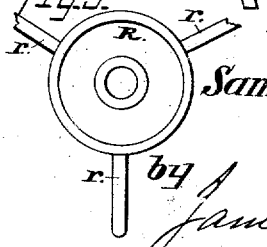
Figure 6:
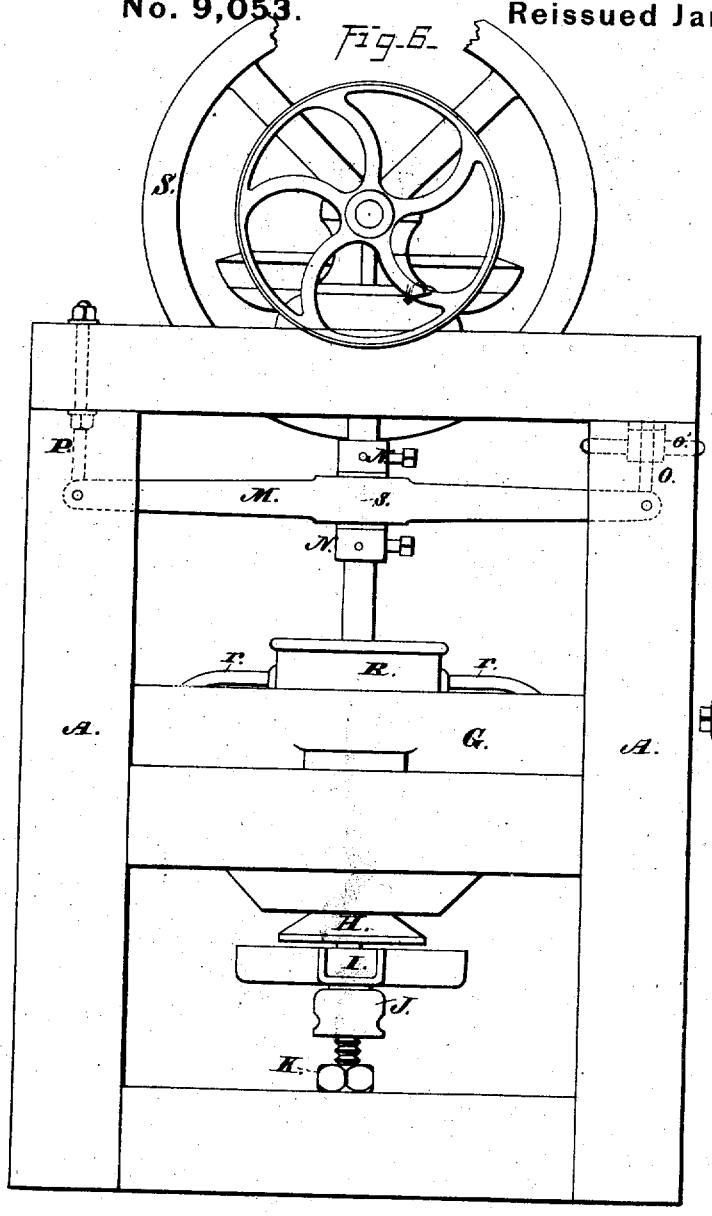
Figures 7, 8:
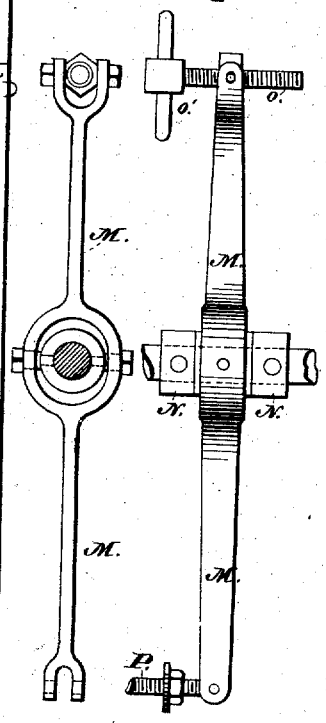

In the drawings, Figure 1 represents a vertical elevation of an embodiment of my invention, partly in section. Fig. 2 represents a detached view of a section of a device for distributing the pulverized material with the metallic pellets to a suitable receptacle. Fig. 3 represents a detached view of an annular conductor for conveying the material as it is discharged from the apparatus to the receptacle for the same. Figs. 4 and 5 represent a detached sectional and plan view of the device for distributing the material to be pulverized to the space between the rubber and pan. Fig. 6 represents a side elevation of the apparatus, showing the devices for securing the adjusting-lever in dotted lines; and Figs. 7 and 8 detached views of the elevating-lever and their connections detached.

The letter A represents a frame constructed of suitable material, carrying the working parts of the apparatus.

B represents a transverse horizontal shaft journaled on the top of the frame and provided at one end with fast and loose pulleys C C, by means of which the apparatus may be thrown into and out of operation, and at the other end with a fly-wheel, S.

The letter D indicates a beveled-gear wheel, mounted on the shaft B, and intermeshing with a beveled-gear wheel, D′, mounted on a vertical shaft, E, journaled near its upper end in the top of the frame A, and at its lower end on a spindle-head, J, mounted on a jack-screw, L, which is supported in a screw-bearing in the lower portion of the apparatus. Said screw is provided with a nut, K, by means of which it can be elevated or lowered.

The letter F indicates a conical rubber, mounted rigidly upon the vertical shaft E, so as to turn with it.

G indicates a conical pan, rigidly secured to the frame A. The conical rubber is adapted to rotate within the pan G. The sides *f g* of the conical rubber and pan converge toward each other from the top to a point near the bottom, from which point the space between the rubber and the pan is uniform to the discharge-opening, as indicated at *k i*. The outer wall or face of the conical rubber, at the top, is extended perpendicularly upward, as indicated at *h*, forming an enlarged space for the reception of the material as it escapes from the distributing-tubes.

The letter R indicates an annular hopper, located directly above the conical rubber F, and provided with a series of curved distributing or delivery tubes, *r*, terminating directly over the space between the rubber and the conical pan at the top.

In the operation of the apparatus the material is introduced into the hopper R, and from thence distributed by the tubes *r* to the space between the conical rubber and pan at the top. In this space the quartz, gravel, or sand is gradually broken up and pulverized as it approaches the lower portions of the cone and pan, the metallic particles being concentrated as the material works down, and rubbed or rolled together into pellets, instead of being disintegrated and ground to powder, as in the ordinary grinding or stamping mills. The auxiliary rubbing-surfaces at the bottom of the rubber and pan serve, further, to concentrate the particles of metal rolled together by the rubbing-surfaces *f g* and solidify the same, so that they will be discharged at the lower part of the apparatus in well-defined pellets.

It will be observed that the essential feature of the relative constructions of the rubber and pan consists in the gradual convergence toward each other of the rubbing or grinding surfaces above a certain point and the practical parallelism of said surfaces below that point.

What I claim is—

1. The process herein described of reducing and pulverizing metalliferous quartz, gravel, or sand and concentrating the metallic particles contained therein, said process consisting in grinding the quartz, gravel, or sand between gradually-converging grinding-surfaces, and then rubbing the ground product between surfaces which are at a uniform distance apart and moving continuously in one direction, whereby the metallic particles are freed from earthy matter and rolled into pellets.

2. An apparatus for pulverizing metalliferous quartz, gravel, sand, or ores, consisting of a rotating conical rubber mounted within a conical pan, the sides of the rubber and pan converging toward each other from the top to a point near the bottom, from which point the space between the rubber and pan is uniform to the discharge-opening, whereby the silicious portions of the material are gradually broken up and reduced to powder within the converging space, while the metallic portions thereof are rolled into pellets within the uniform space, substantially as specified.

In testimony that I claim the foregoing as my own I have hereunto set my hand in the presence of the subscribing witnesses.

SAML. F. HODGE.

Witnesses:
WM. A. MOORE,
ROBERT M. CHAMBERLAIN.